United States Patent
Mayuzumi (10) Patent No.: US 9,621,857 B2
(45) Date of Patent: Apr. 11, 2017

(54) SETTING APPARATUS, METHOD, AND STORAGE MEDIUM

(71) Applicant: CANON KABUSHIKI KAISHA, Tokyo (JP)

(72) Inventor: Ichiko Mayuzumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 14/338,370

(22) Filed: Jul. 23, 2014

(65) Prior Publication Data

US 2015/0035976 A1    Feb. 5, 2015

(30) Foreign Application Priority Data

Aug. 5, 2013 (JP) .................................. 2013-162801
May 16, 2014 (JP) .................................. 2014-102734

(51) Int. Cl.
*H04N 7/18* (2006.01)
*G06K 9/00* (2006.01)

(52) U.S. Cl.
CPC ......... *H04N 7/183* (2013.01); *G06K 9/00288* (2013.01); *G06K 9/00993* (2013.01)

(58) Field of Classification Search
None
See application file for complete search history.

(56) References Cited

U.S. PATENT DOCUMENTS

| | | | | |
|---|---|---|---|---|
| 2002/0167403 | A1* | 11/2002 | Colmenarez | G08B 13/19602 340/541 |
| 2008/0260212 | A1* | 10/2008 | Moskal | A61B 5/1079 382/118 |
| 2009/0059007 | A1 | 3/2009 | Wagg et al. | |
| 2009/0189984 | A1 | 7/2009 | Yamazaki | |
| 2009/0256678 | A1* | 10/2009 | Ryu | G06F 17/30265 340/5.83 |
| 2010/0245567 | A1* | 9/2010 | Krahnstoever | G06K 9/00295 348/143 |
| 2011/0209066 | A1* | 8/2011 | Sakata | H04H 60/45 715/735 |
| 2011/0317928 | A1* | 12/2011 | Yabu | G06K 9/00677 382/225 |
| 2012/0114176 | A1 | 5/2012 | Kawano | |
| 2013/0307974 | A1 | 11/2013 | Kawano | |

FOREIGN PATENT DOCUMENTS

JP    2008-270896 A    11/2008

* cited by examiner

*Primary Examiner* — Hung Dang
*Assistant Examiner* — Sunghyoun Park
(74) *Attorney, Agent, or Firm* — Carter, DeLuca, Farrell & Schmidt, LLP (57) ABSTRACT

A setting apparatus, that sets a frequency for determining whether an object in a moving image is a predetermined object, determines whether an object in the moving image is the predetermined object, and when it determines that the object is the predetermined object, it sets the frequency for determining to be lower than before determining that the object is the predetermined object.

21 Claims, 8 Drawing Sheets

TRACKING INFORMATION (PORTION)

| ID | FACE DETECTION | FACE AUTHENTICATION | DIVISION EVENT | INTEGRATION EVENT |
|---|---|---|---|---|
| 5 | DETECTED | AUTHENTICATED (A) | DOES NOT EXIST | DOES NOT EXIST |
| 6 | DETECTED | AUTHENTICATED (B) | DOES NOT EXIST | DOES NOT EXIST |
| 7 | DETECTED | AUTHENTICATED (C) | DOES NOT EXIST | EXISTS |
| 8 | NOT YET DETECTED | UNAUTHENTICATED | EXISTS | DOES NOT EXIST |

SETTING APPARATUS, METHOD, AND STORAGE MEDIUM

BACKGROUND OF THE INVENTION

Field of the Invention

The present invention relates to a technique for setting a frequency for determining whether an object in a moving image is a predetermined object.

Description of the Related Art

Conventionally systems for tracking people within an image of a monitoring camera, and confirming a flow of people, and systems for tracking a particular person by matching a tracked person are used.

Regarding tracking of a person in a display screen, there are cases in which when tracked people intersect with each other, the people are switched and tracked, in which when a person is hidden by an occluding object the tracking cannot be continued, and in which detection as a different person is made.

Also, in systems for tracking a particular person, there are cases in which processing does not keep up with a frame rate when a person and registrant information is matched for every processed image, and as a result a precision of matching, tracking, or the like, is reduced.

In order to alleviate this kind of processing load, in Japanese Patent Laid-Open No. 2008-270896, a person within a display screen is matched, and when the matching succeeds, transition is made to a tracking mode, and the matching is stopped, for example. With this, processing burden for the matching can be omitted, and a processing frame rate can be maintained.

Also, in U.S. Patent Application Publication No. 2009/0059007, a path of movement of a player is displayed at a soccer game. After authenticated person A and person B overlap and become one subject, one divided subject is authenticated in a case where the one subject divides into two subjects. In a case where an authentication result is the person A, the other subject is determined to be the person B.

However, in Japanese Patent Laid-Open No. 2008-270896, as previously described, regarding the tracking of people, a situation where a switching of people occurs due to an intersection of the people, or due to an occluding object, and a person D is tracked when the intent was to track a person C will occur easily. Also, in U.S. Patent Application Publication No. 2009/0059007, while authenticated people are overlapping, it is unknown whether a person A or a person B is displayed as the subject on a display screen.

SUMMARY OF THE INVENTION

The present invention determines whether an object of a moving image is a predetermined object or not precisely with an appropriate processing burden.

Also, the present invention provides a setting apparatus operable to set a frequency for determining whether an object in a moving image is a predetermined object, the apparatus comprising a determination unit configured to determine whether an object in a moving image is a predetermined object and a setting unit configured to set, when it is determined that the object is the predetermined object, a frequency for determining by the determination unit to be lower than before it is determined that the object is the predetermined object.

Also, the present invention provides a method of setting a setting apparatus operable to set a frequency for determining whether an object in a moving image is a predetermined object, the method comprising determining whether an object in a moving image is a predetermined object and in accordance with the object dividing into a plurality of objects or the object being integrated with another object, setting the frequency for determining to be higher than before the object divides into the plurality of objects or the object is integrated with the other object.

Further features of the present invention will become apparent from the following description of exemplary embodiments with reference to the attached drawings.

DESCRIPTION OF THE EMBODIMENTS

Embodiments of the present invention will now be described hereinafter in detail, using the accompanying drawings.

Figure 1:
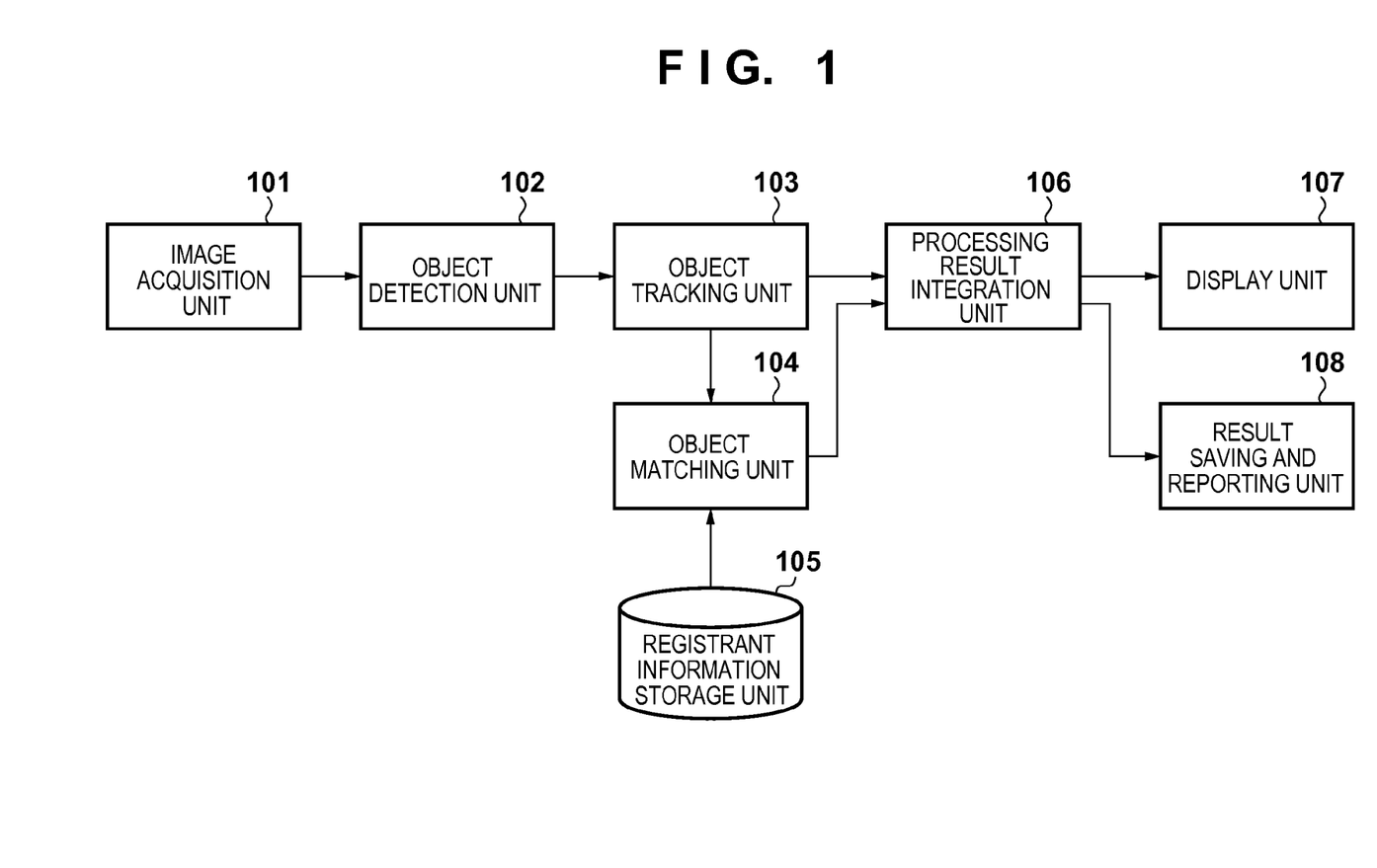
FIG. 1 is a block diagram of an image processing apparatus according to a first embodiment.

FIG. 1 is a block diagram of an image processing apparatus which is a setting apparatus according to a first embodiment.

The setting apparatus of this system is comprised of an image acquisition unit 101, an object detection unit 102, an object tracking unit 103, an object matching unit 104, a registrant information storage unit 105, a processing result integration unit 106, a display unit 107, and a result saving and reporting unit 108.

In this embodiment, human body detection, face detection, and face recognition are used for explanation of object detection and matching, but limitation is not made to this. For example, another object detection approach and authentication method such as using a gait authentication can be used.

The image acquisition unit 101 acquires a moving image or a sequence of images of a processing target (image frame) from an external apparatus in chronological order (input). The external apparatus for acquiring the images is not limited to a camera, and the images may be saved on the external apparatus, which may be a server, an external memory, or the like. Also, this setting apparatus may have built-in a camera, and the setting apparatus may acquire an image from a camera at remote location via a network such as an IP network.

The object detection unit 102 detects an object from the image (in the moving image) acquired by the image acquisition unit 101 by using a predetermined detection approach such as a background subtraction method. The detection approach is not limited to the background subtraction method, and may be processing using another characteristic amount such as a motion vector. A detection target object may be simply a moving object, or may be a detected human body or a detected face. Furthermore, an object whose characteristic amount (shape, form, color, et cetera) changes at a certain position may be detected.

Hereinafter, an explanation of a case where a moving object is detected will be given. The object detection unit 102 outputs an object detection result holding a position, a circumscribing rectangle and an object size of an object on a display screen of the display unit 107 displaying an image as a detection result.

The object tracking unit 103 tracks the object between image frames by associating the object detected on an immediately preceding image frame (a first object) and the object detected on a current image frame (an image of interest frame) (a second object (identified as the first object)). Note, tracking may be performed every other frame or every few frames, rather than every frame.

For a newly detected object, a specific tracking ID is newly added, while for an object associated with the previous frame, a tracking to which the tracking ID appended in the previous frame is appended is output. The tracking stores characteristic information such as an in-screen position, a size and a speed of the detected object, or an object association status.

The object tracking unit 103 estimates a tracking position in the current image frame from the position or the size, and the speed of the tracking in the previous image frame, and associates the tracking position with an object detection result of an object existing at the estimated position proximity on the screen.

The object matching unit 104 performs a matching of a tracked object (a subject) and pre-registered objects (a person, for example). Information of the pre-registered objects is recorded on the registrant information storage unit 105 which is a storage medium. In this embodiment, the information of the pre-registered object is information of a person (registrant information), and in particular the information of the pre-registered object is facial information for identifying the face of the person. However, limitation is not made to facial information, and any kind of information of the person may be used information as long as the information is for identifying an individual person.

The object matching unit 104 sets a matching frequency, performs the matching at the frequency that is set, and changes the matching frequency at a predetermined timing. Also, the matching information is not limited to information for identifying an individual person, but also may be a matching with human body information (facial information) for determining whether the detected object is human body (or face) or not.

The object matching unit 104 detects a face from a tracked object and performs the authentication of the person by matching the detected face with registrant information recorded in the registrant information storage unit 105. Regarding the matching result, the object matching unit 104 outputs a matching result (a face detection result, a face recognition result, or the like) such as whether a face is detected or not, whether a detected face can be matched, who is the matched person, or the like.

Note, here the information of the pre-registered objects is assumed to be person information, but it also can be information of another object whose face is recognizable such as an animal, a full-body suit, or the like, for example.

In the processing result integration unit 106, the processing result of the object tracking unit 103 (the tracking information) and the processing result of the object matching unit 104 (the matching result) are integrated. The processing result of the object matching unit 104 (face detection result/face recognition result) is written in the tracking information which is information of the tracked object, and is transmitted to the result saving and reporting unit 108. Also, the tracking information, the face detection/matching result, and the image acquired by the image acquisition unit 101 are combined and transmitted to the display unit 107. Note, the display unit 107 may be built-in to the setting apparatus. The display unit 107 may be a separate display unit a case where the setting apparatus is comprised in a PC (Personal Computer). Also, the information may be transmitted to a display apparatus at a remote location via a network such as an IP network.

The processing result integration unit 106 overlays a frame that surrounds the object detected by the object detection unit 102 onto the image obtained by the image acquisition unit 101. Also, the processing result integration unit 106 overlays the tracking ID appended to the object by the object tracking unit 103 on a predetermined position of the frame that surrounds the object.

The processing result integration unit 106 encloses an object determined to be a human body by the object matching unit 104 with a red frame, and encloses an object not determined to be a human body with a white frame. The processing result integration unit 106 encloses an object determined by the object matching unit 104 to be the face of the specific person with a yellow frame, and encloses an object determined to be the face of an unidentified person with a green frame. Note, the colors of the frames are not limited to be the colors described above, and it is only necessary to display in a form in which it is distinguishable that processing results are different in cases where the processing results by the object matching unit 104 (the object tracking unit 103) are different. Also, in place of changing the color, the type of the line (solid line, dotted line, dashed-dotted line, or the like) indicating the frame may be changed, and both the color and the type of the line may be changed.

The display unit 107 displays the image generated by the processing result integration unit 106 on a monitor (such as a liquid crystal monitor) for example.

Also, the result saving and reporting unit 108 stores the processing result on a storage medium such as a semiconductor memory or a hard disk drive, and reports (transmits) the content to a designated report destination (for example, a user apparatus) with a predetermined message. The result saving and reporting unit 108 reports, for example, the detection of a person matching with the information of a registrant registered in the registrant information storage unit 105 (or the detection of a person who does not match with the information of the registrants) to the report destination. A save destination of the processing result may be a storage unit built-in to the setting apparatus or an external storage apparatus such as an SD card connected to the setting apparatus, and may be a storage apparatus at a remote location connected via a network such as an IP network.

Also, the content reported by the result saving and reporting unit 108 is an image acquired by the image acquisition unit 101, a tracking added by the object tracking unit 103, a matching result of the object matching unit 104, or the like.

Note, the image processing apparatus may be realized by using respective dedicated hardware. Also, the image processing apparatus may be realized by using normal hardware mounted on a general purpose computer (for example, a CPU, a RAM, a ROM, a hard disk drive, an external storage apparatus, a network interface, a display, a keyboard, a mouse, or the like). In such a case, each configuration element in FIG. 1 is functionally realized by executing a program stored in the memory (the RAM or the ROM) on this hardware by the CPU.

Next, the face detection/face recognition processing executed by the object matching unit 104 is explained using FIG. 2A to FIG. 4.

Figure 3A:
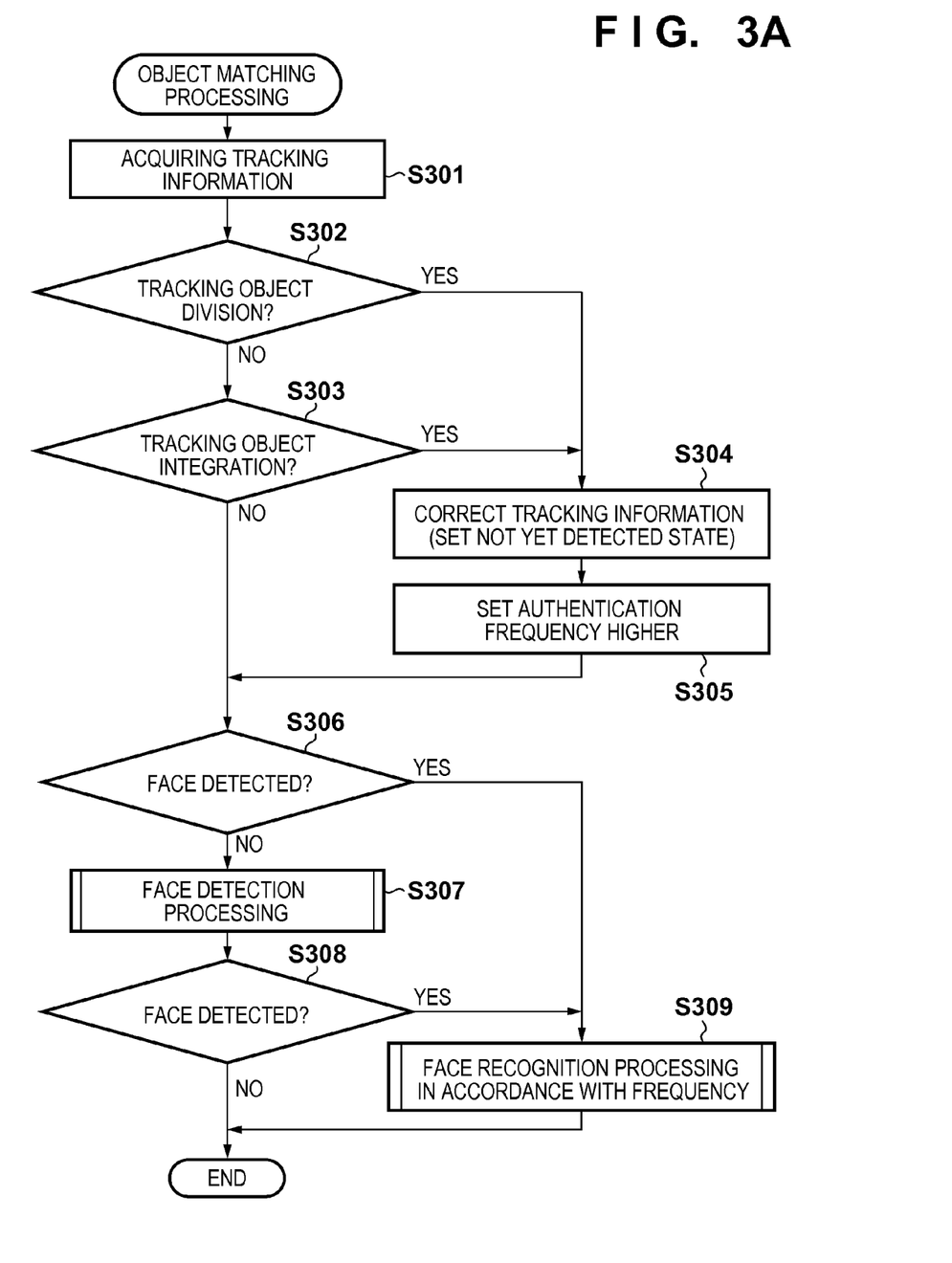
FIG. 3A is a flowchart for showing object matching processing according to the first embodiment.
Figure 3B:
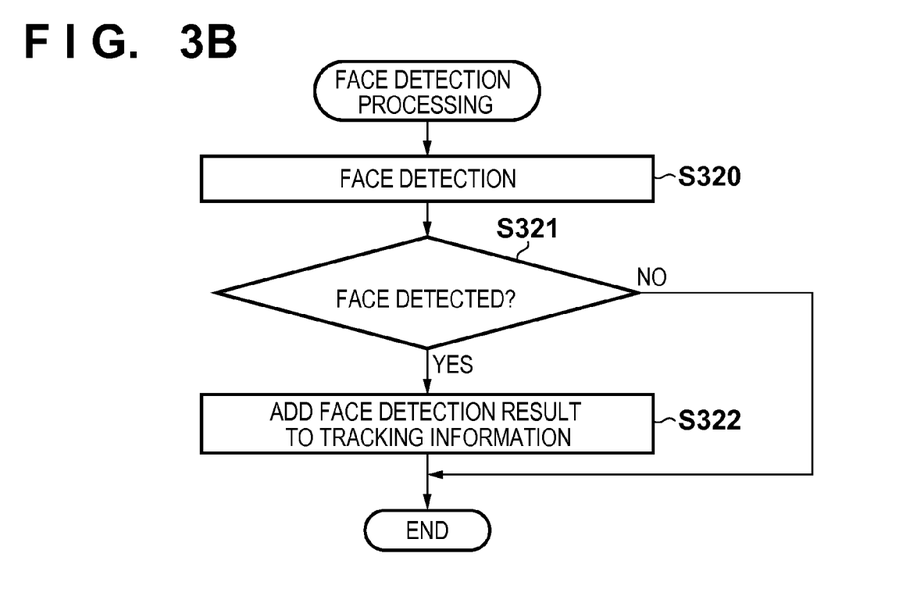
FIG. 3B is a flowchart for showing face detection processing according to the first embodiment.
Figure 3C:
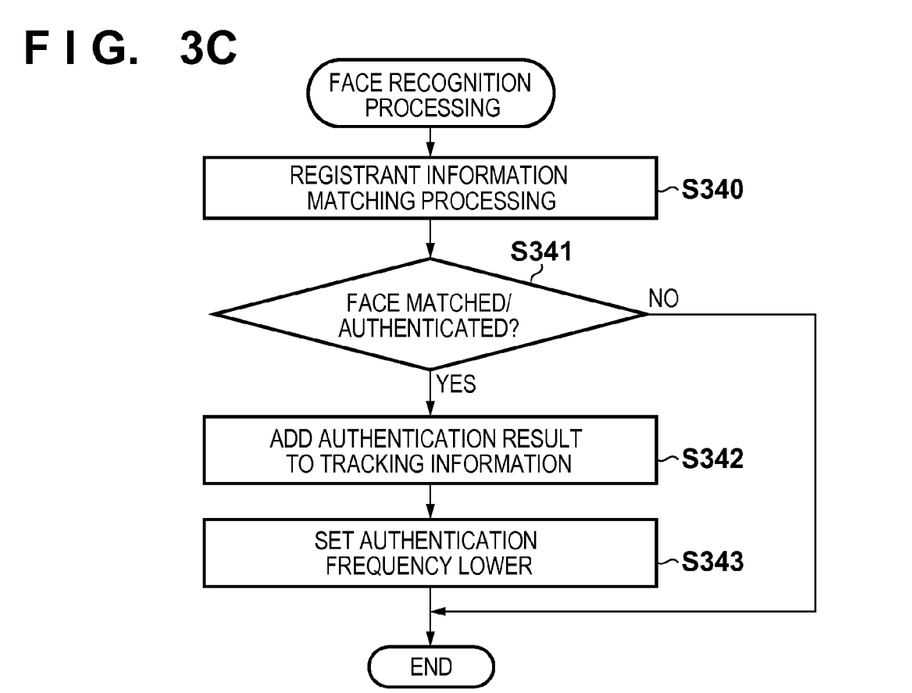
FIG. 3C is a flowchart for showing a face recognition processing according to the first embodiment.
Figure 4:
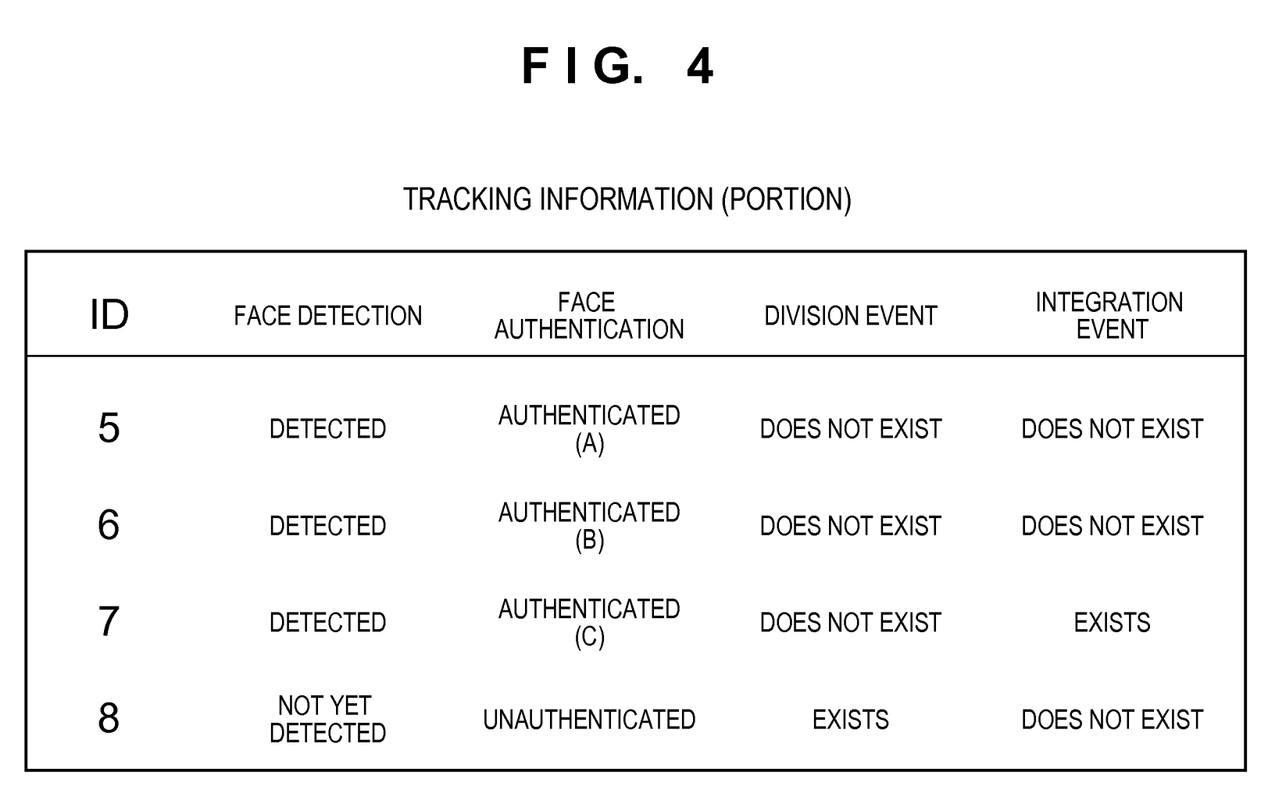
FIG. 4 is a view for showing an example of tracking information according to the first embodiment.

FIG. 2A to FIG. 2D show examples displayed on a display screen of the display unit 107, and shows processes of the detecting of people, the detecting/matching of faces, and the intersection, and separation of the people. FIG. 3A to FIG. 3C are flowcharts for showing object matching processing (the tracking of objects, face detection, face recognition). FIG. 4 shows a portion of tracking information for managing detected objects. Hereinafter, explanation will be given with using FIG. 2A to FIG. 2D.

Figure 2A:
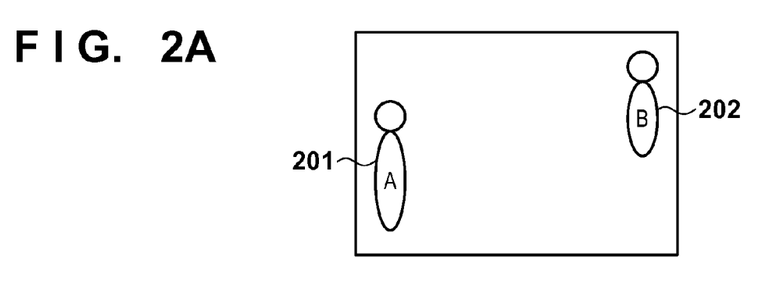
FIG. 2A is a view for explaining a case where a person is matched according to the first embodiment.

In FIG. 2A, on the display screen, a person A 201 and a person B 202 are detected as objects by an object detection unit 102, and a tracking for the detected objects is initiated by the object tracking unit 103. The object tracking unit 103 manages the tracking information of the tracked objects (tracking objects) as is partially shown in FIG. 4. The object tracking unit 103 comprises a memory (not shown) for storing the tracking information. Also, the tracking information may be stored on within the setting apparatus or in an external storage unit. The tracking information includes, for example, an ID item, a face detection item, a face recognition item, a division event item, and an integration event item.

The ID item is for managing an ID for identifying a tracking object uniquely. The face detection item is for managing information indicating whether a face is detected from an object or not (detection status: "detected"/"not yet detected"). This face detection is not a determination of whether a face is of a particular person, but a determination whether a face is of an unspecified person. The face recognition item manages the information indicating whether the detected face is authenticated or not (authentication state (match status): "authentication (person name)"/"unauthenticated"). This face recognition means that a face is determined to be a face registered in the registrant information storage unit 105.

The division event item is for managing the information indicating whether a division event of a tracking object occurs or not (division status: "exists"/"does not exist"). The integration event item is for managing the information indicating whether an integration event occurs or not (integration status: "exists"/"does not exist").

Note, items managed as additional information are not limited to the items shown in FIG. 4, and information items specific to other tracking can be managed.

Here, the division event means a case where a situation arises in which one tracking object is detected as two or more tracking objects in correspondence with the tracking (a situation where one tracking object divides into a plurality of tracking objects). For example, the division event is an event where a situation where one tracking object (an integration object) is detected in a case where two tracking objects are overlapping (an integration status) occurs, and then a situation where the two tracking objects are detected respectively because they separate from each other (a division status) occurs.

On the other hand, the integration event means a situation where two or more tracking objects are detected as one tracking object (an integration object) in correspondence with the tracking (a situation where a plurality of tracking objects are integrated into one tracking object). For example, the integration event is an event where a situation where two tracking objects are detected (a division state) occurs, and then a situation where two tracking objects are detected as one tracking object due to the objects approaching each other and overlapping (an integration state) occurs.

In a case where the object tracking unit 103 determines that the integration event occurs, the object tracking unit 103 sets the tracking information of the two or more tracking objects, for which the integration event occurs, to "integration event exists". Also, in a case where two or more integrated objects divide, the tracking information of the objects associated with the division event is set to "division event exists".

In a case of the situation in FIG. 2A, the object matching unit 104 acquires the tracking information (FIG. 4) of a tracking object from the storage unit (not shown) in step S301, in FIG. 3A. Next, in step S302, the object matching unit 104 determines whether a division of the tracking object occurs or not referencing the division event item of the tracking information. In a case where a division of the tracking object does not occur (NO in step S302), the processing proceeds to step S303. On the other hand, in a case where a division of the tracking object occurs (YES in step S302), the processing proceeds to step S304.

In a case of the situation in FIG. 2A, because the situation is immediately after a person A 201 and a person B 202 are detected as objects respectively and because a division event does not occur, the processing proceeds to step S303.

In step S303, the object matching unit 104 determines whether an integration of the tracking objects occurs or not by referencing the integration event item of the tracking information. In a case where an integration of the tracking objects does not occur (NO in step S303), the processing proceeds to step S306. On the other hand, in a case where an integration of the tracking objects occurs (YES in step S303), the processing proceeds to step S304.

In a case of the situation in FIG. 2A, because an integration event does not occur for the person A 201 and the person B 202, the processing proceeds to step S306.

In step S306, the object matching unit 104 determines whether a face is detected in tracking objects or not by referencing the face detection item of the tracking information. In a case where a face is not detected (NO in step S306), the processing proceeds to step S307. On the other hand, in a case where a face is detected (YES in step S306), the processing proceeds to step S309.

In a case of the situation in FIG. 2A, because a face is not detected yet, the processing proceeds to face detection processing of step S307. Note, in this state, face recognition is not being executed.

An internal processing flow of face detection processing 307 is shown in FIG. 3B. In face detection processing, the object matching unit 104 executes face detection processing at a region of an object in step S320. In a case of the situation in FIG. 2A, face detection processing is executed in a rectangle surrounding the object 201 and a rectangle surrounding the object 202. Next, in step S321, the object matching unit 104 determines whether a face is detected or not. In a case where a face is detected (YES in step S321), the object matching unit 104 adds information ("detected") indicating a face is detected to the face detection item of the tracking information (FIG. 4) as a face detection result in step S322, and completes the processing. In a case of the situation in FIG. 2A, it is assumed that a face is detected. On the other hand, in a case where a face is not detected (NO in step S321), the face detection result is not added to the tracking information and the process is terminated.

Note, face detection processing may be performed irrespective of whether a face is detected or not. As shown in FIG. 3A, an increase of the load for the face detection can be prevented by performing the face detection in a case where a face is not detected. On the other hand, more correct face detection becomes possible by performing face detection processing irrespective of whether a face is detected or not.

Returning to FIG. 3A, the object matching unit 104 determines whether a face is detected or not by referencing the face recognition item from the tracking information in step S308. In a case where a face is detected (YES in step S308), the processing proceeds to step S309. On the other hand, in a case where a face is not detected (NO in step S308), the process is terminated.

In a case of the situation in FIG. 2A, the processing proceeds to the face recognition processing in step S309 because a face is detected in step S307.

An internal processing flow of the face recognition processing 309 is shown in FIG. 3C. In the face recognition processing, face recognition processing is executed in accordance with a predetermined frequency (an authentication frequency). For example, in a case where the authentication frequency is set not less than a predetermined frequency, for example, the face recognition processing is executed in every frame. Also, in a case where the authentication frequency is set less than a predetermined frequency, for example, the face recognition processing is executed one time every 10 frames. Note, configuration may be taken such that the face recognition processing is executed in accordance with unit of processing (number of frames) indicated by a set authentication frequency, rather than with a comparison of a predetermined value.

The authentication frequency is set to execute the authentication processing at a predetermined frequency (for example every frame) in an initial state. And, as will be explained later, the object matching unit 104 decreases the frequency of the authentication processing so that the authentication processing is performed at a frequency lower than the predetermined frequency in a case where a face is authenticated. Also, the frequency of the authentication processing is increased again in a case where a division or integration of the tracking object occurs after the frequency of the authentication processing is lowered.

In a case of executing the face recognition processing, the object matching unit 104 performs the matching processing for matching a detected face and registrant information recorded in the registrant information storage unit 105 in step S340. In step S341, the object matching unit 104 determines whether the detected face is matched/authenticated or not. In a case where the detected face is matched/authenticated (YES in step S341), the object matching unit 104 adds the authentication result to the face recognition item of the tracking information in step S342. The authentication result is information (for example the authentication (A) indicating a person A in FIG. 4) of person.

Next, the object matching unit 104 sets the authentication frequency of the face recognition processing for the object to be lower in step S343 because the authenticating could be done for the processing target object, and completes the face recognition processing.

On the other hand, in a case where a face is not matched/authenticated (NO in step S341), the object matching unit 104 completes the processing without adding the authentication result to the tracking information. In such a case, the authentication frequency of the face recognition processing for the processing target object is not changed. Alternatively, configuration may be taken such that the authentication frequency is set to be higher than the authentication frequency set currently in order to increase a possibility of authentication.

Figure 2B:
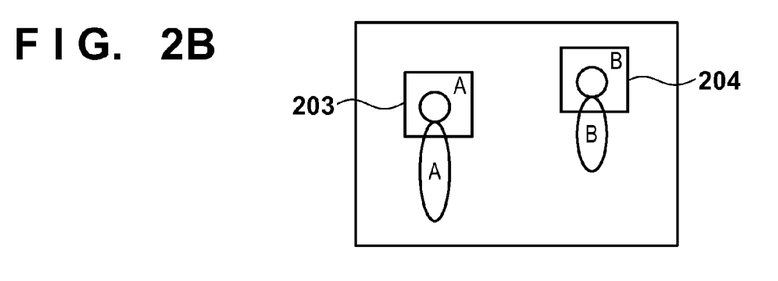
FIG. 2B is a view for explaining a case where a person is matched according to the first embodiment.

FIG. 2B is showing the image frame displayed after the processing described above has been completed. FIG. 2B is showing a situation where the object tracking unit 103 determines that an object determined to be a person A in a situation of FIG. 2A moves right, and an object determined to be a person B in a situation of FIG. 2A moves left.

In the tracking information (FIG. 4) of the person A, the ID item is "ID 5", the face detection result item is "detected", the face recognition result item is "authenticated (A)", and both the division event item and the integration event item are "does not exist". In the display unit 107, an authentication frame 203 indicating the person A is displayed for the person A. The authentication frame 203 is showing that a face is detected in the authentication frame 203, and further, that the detected face is determined to be the face of the person A.

Also, in the tracking information (FIG. 4) of the person B, the ID item is "ID 6", the face detection result item is "detected", the face recognition result item is "authenticated (B)", and both the division event item and the integration event item are "does not exist". In the display unit 107, an authentication frame 204 indicating the person B is displayed for the person B. The authentication frame 204 is showing that a face is detected in the authentication frame 204, and further, that the detected face is determined to be the face of the person B.

In the object matching processing for the person A in FIG. 2B, the object matching unit 104 acquires the tracking information in step S301. In step S302, the object matching unit 104 determines that division of a tracking object does not occur from the tracking information. In step S303, the object matching unit 104 determines that integration of a tracking object does not occur from the tracking information. In step S306, the object matching unit 104 determines that a face is detected.

In step S309, the object matching unit 104 performs the face recognition processing in accordance with the frequency. Here, the face recognition processing for the faces in the authentication frames 203 and 204 based on the image in FIG. 2B is not performed, because the face recognition based on the image in FIG. 2A succeeds and the authentication frequency is set low in step S343.

In this way, in a case where a person is matched once and a division event and an integration event of an object do not occur, the authentication frequency (the matching frequency) of the face recognition processing for succeeding image frames by the object matching processing is controlled. With this, the load of the object matching processing can be reduced. The object matching processing for the person B in FIG. 2B is the same as the object matching processing for the person A.

Figure 2C:
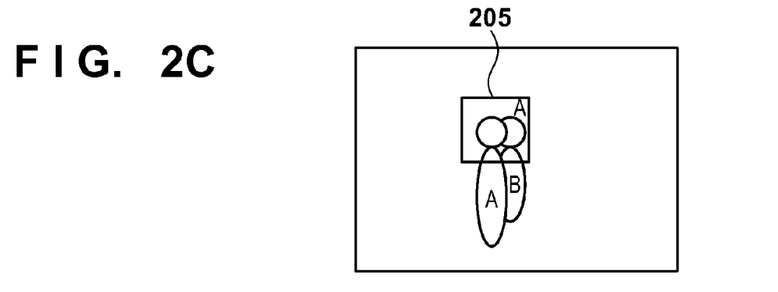
FIG. 2C is a view for explaining a case where a person is matched according to the first embodiment.

Next, regarding the people on the display screen, an overlapping of the people occurs, as shown in FIG. 2C. At this time, the object tracking unit 103 generates the tracking information for integrated two objects. In the tracking information in FIG. 4, the integration event item is managed to be "exists".

In a situation of the object matching processing in FIG. 3 for the object in FIG. 2C, the object matching unit 104 acquires the tracking information in step S301. In step S302, the object matching unit 104 determines that the division of the tracking object does not occur by referencing the division event item of the tracking information.

In step S303, the object matching unit 104 determines whether integration of the tracking object occurs or not by referencing the integration event item of the tracking information. In a case where the integration event occurs, the object matching unit 104 corrects (updates) the tracking information in step S304. More specifically, the object matching unit 104 changes the face detection item of the tracking information for the ID 5 and the ID 6 to "not yet detected" and the face recognition item to "unauthenticated". This is because it is necessary to once again execute the face detection processing and the face recognition processing because there is a strong possibility that the content of the face detection item and the face recognition item, detected between a previous image frame and an immediately preceding image frame, are changed due to the tracking objects being integrated.

The object matching unit 104 sets the authentication frequency for the integrated objects higher than the predetermined frequency in step S305. The object matching unit 104 determines whether a face is detected by referencing the face detection item of the tracking information of the ID 5 and the ID 6 in step S306. In such a case, the processing proceeds to step S307 because a face is not detected, and the object matching unit 104 executes face detection processing (FIG. 3B).

In a situation of FIG. 2C, because the person A exists in front, here the face of the person A is detected as a face. The object matching unit 104 adds the information ("detected") indicating the detection of a face to the face detection item of the tracking information (FIG. 4) of the ID 5 and the ID 6 as the face detection result.

Note, the authentication frequency is controlled within of the object matching unit 104, and in a case where the authentication frequency is set lower than a predetermined frequency, the authentication is executed one time every predetermined number of frames (for example every 10 frames). In a case where the authentication frequency is set higher than a predetermined frequency, the authentication frequency may be determined in accordance with intended use of the image processing apparatus, and, the authentication may be executed every frame, for example.

Next, in step S308, the object matching unit 104 determines that a face is detected by referencing the face recognition item of the tracking information of the ID 5 and the ID 6. The object matching unit 104 executes the face recognition processing (FIG. 3C) in step S309. In the face recognition processing, the object matching unit 104 authenticates the detected face to be person A by matching the detected face and the registrant information recorded in the registrant information storage unit 105, and completes the object matching processing. Here, the object matching unit 104 adds the authentication result indicating that the face of the person A is authenticated to the face recognition item of the tracking information of the ID 5. Also, the object matching unit 104 sets (resets) the integration event of the tracking information of the ID 5 to "does not exist" because the update of the face recognition item of the tracking information of the ID 5 has completed. Here, the object matching unit 104 sets the matching frequency of the face of the person A corresponding to the image in the authentication frame 205 to be lower. On the other hand, the matching frequency of the face of the person B corresponding to the image in the authentication frame 205 is kept high and not changed.

In FIG. 2C, the authentication frame 205 is displayed as the authentication result indicating that the authenticated object is the person A because the authenticated object (person) is authenticated to the person A.

Figure 2D:
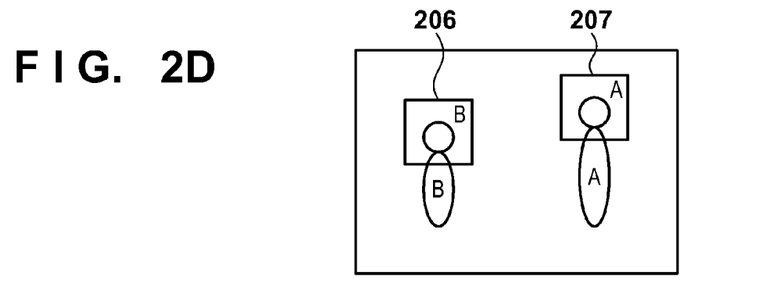
FIG. 2D is a view for explaining a case where a person is matched according to the first embodiment.

Next, regarding the people on the display screen, it is assumed that the overlapping people separate from each other as in FIG. 2D and are detected as two objects. At this time, the object tracking unit 103 generates the tracking information for the divided objects. In the tracking information in FIG. 4, the division event item is managed as "exists".

In the object matching processing of FIG. 3 for FIG. 2D, the object matching unit 104 acquires the tracking information in step S301.

In step S302, the object matching unit 104 determines that the division of the tracking object occurs by referencing the division event item of the tracking information. In a case where the division event occurs, the object matching unit 104 corrects (updates) the tracking information of the ID 5 and the ID 6 in step S304. More specifically, the object matching unit 104 changes the face detection item of the tracking information to "not yet detected" and the face recognition item to "unauthenticated". This is because it is necessary to execute the face detection of an object and the face recognition processing again upon division of the tracking object. Note, when an object is first detected by the object detection unit 102 and an ID is appended to the object, the face detection and the face recognition are not performed, so initial values of these items are "not yet detected", and "unauthenticated".

The object matching unit 104 sets the authentication frequency higher than the predetermined frequency in step S305. The object matching unit 104 determines whether a face is detected by referencing the face detection item of the tracking information of the ID 5 and the ID 6 in step S306. In such a case, the processing proceeds to step S307 because a face is not detected, and the object matching unit 104 executes face detection processing (FIG. 3B). The object matching unit 104 adds the information ("detected") indicating that a face is detected to the face detection item of the tracking information (FIG. 4) of the ID 5 and the ID 6 as the face detection result, because faces are detected from both of the divided objects.

The object matching unit 104 determines that faces are detected by referencing the face recognition item of the tracking information of the ID 5 and the ID 6 in step S308. The object matching unit 104 executes the face recognition processing (FIG. 3C) in step S309. In the face recognition processing, the object matching unit 104 executes the face recognition processing by matching the detected faces and the registrant information recorded in the registrant information storage unit 105, and then, the object matching processing completes. Here, the object matching unit 104 adds the authentication result indicating that the faces of the person A and the person B are authenticated to the face recognition item of the tracking information of the ID 5 and the ID 6. Also, the object matching unit 104 sets the division event of the tracking information of the ID 5 and the ID 6 to "does not exist" because the update of the face recognition item of the tracking information of the ID 5 and the ID 6 has been completed. The object matching unit 104 sets the authentication frequency of the face recognition processing for the authentication frames 206 and 207 to be lower.

By the object matching processing, in the display unit 107, the authentication frame 206 indicating the person B is displayed and the authentication frame 207 indicating the person A is displayed as shown in FIG. 2D.

As explained above, by the first embodiment, the object matching processing for an object detected from the image of interest frame is executed, and in correspondence with the matching result, the frequency of executing the object matching processing for the image frames thereafter following the image frame is controlled. With this, a high precision tracking of an authenticated person can be realized by reducing processing load for the matching and by executing matching processing when a division or an integration of a object occur.

Figure 5:
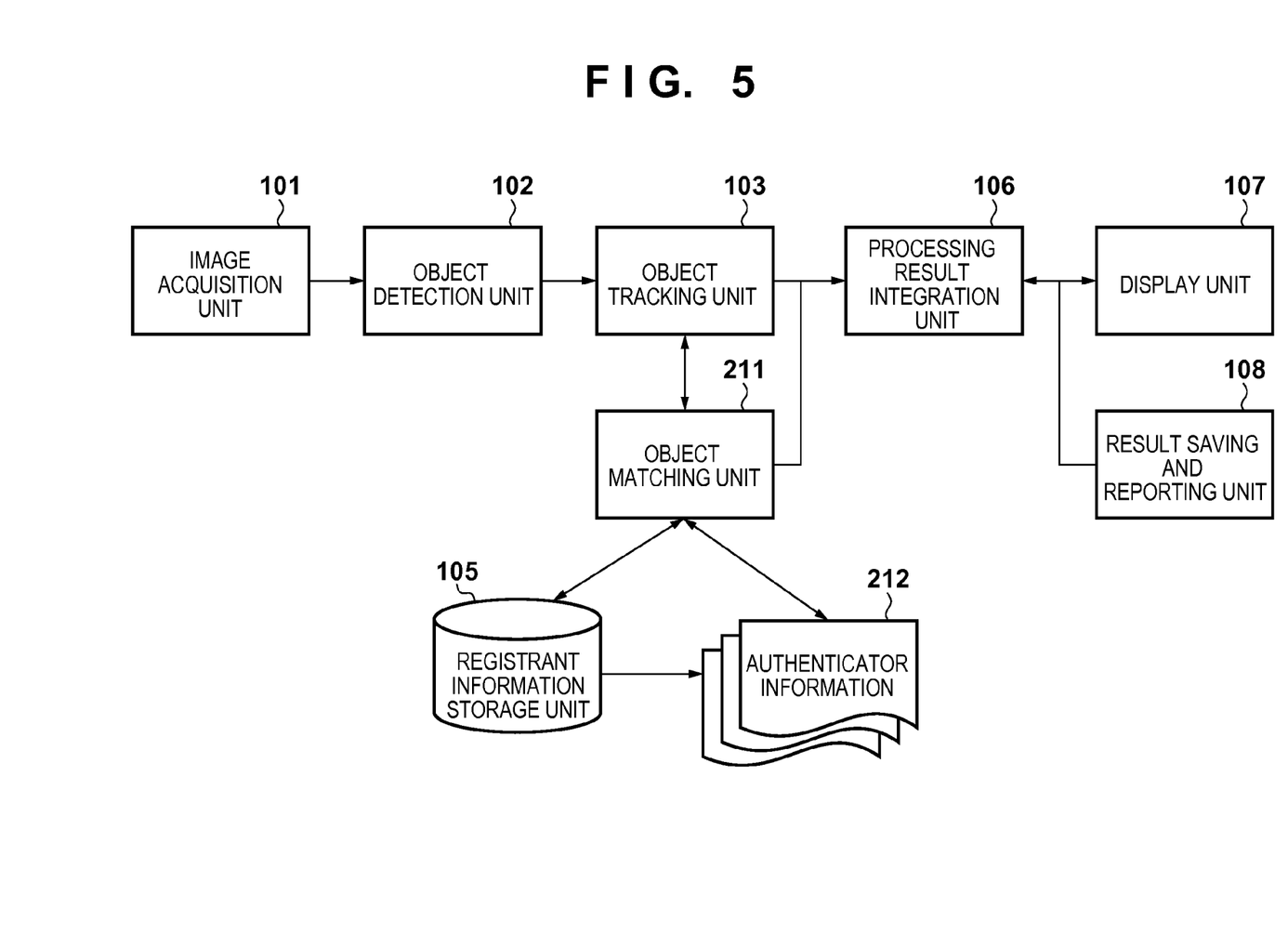
FIG. 5 is a block diagram of an image processing apparatus according to the second embodiment.

FIG. 5 is a block diagram of an image processing apparatus according to a second embodiment. In FIG. 5, the same reference numerals are added for common configuration elements with the first embodiment in FIG. 1 and explanation is omitted.

Numeral 211 denotes an object matching unit that executes processing for matching a detected/tracked object and registrant information recorded in the registrant information storage unit 105. The object matching unit 211 stores registrant information matched once in other memory as authenticator information 212. Hereinafter, in a case where a re-matching of an object occurs, the matching with the authenticator information 212 is performed first, and in a case where the matching with the authenticator information 212 fails, the matching with registrant information in the registrant information storage unit 105 is performed. In the registrant information storage unit 105, a plurality of registrant information is registered in advance.

FIG. 6A to FIG. 6D are showing examples displayed on the display unit 107, and showing a process of a detection of people, a face detection, and a face recognition, and a process where the people intersect and separate.

Hereinafter, the face detection/face recognition processing in the object matching unit 211 is explained.

Figure 6A:
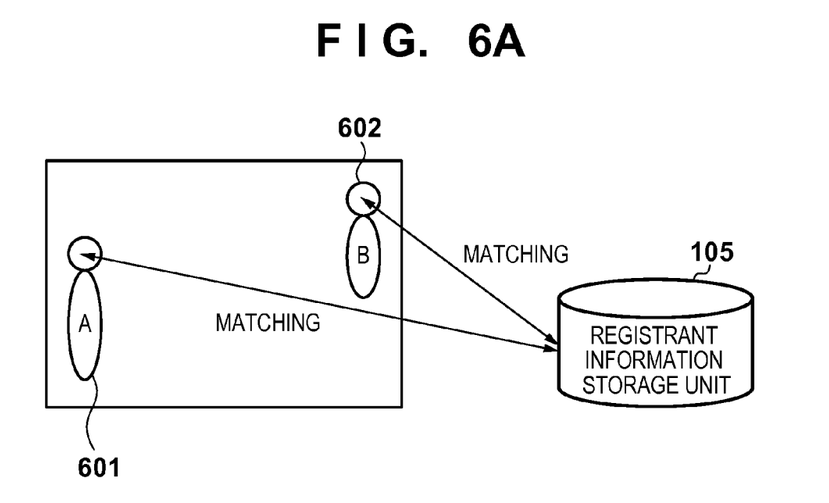
FIG. 6A is a view for explaining a case where a person is matched according to the second embodiment.
Figure 6B:
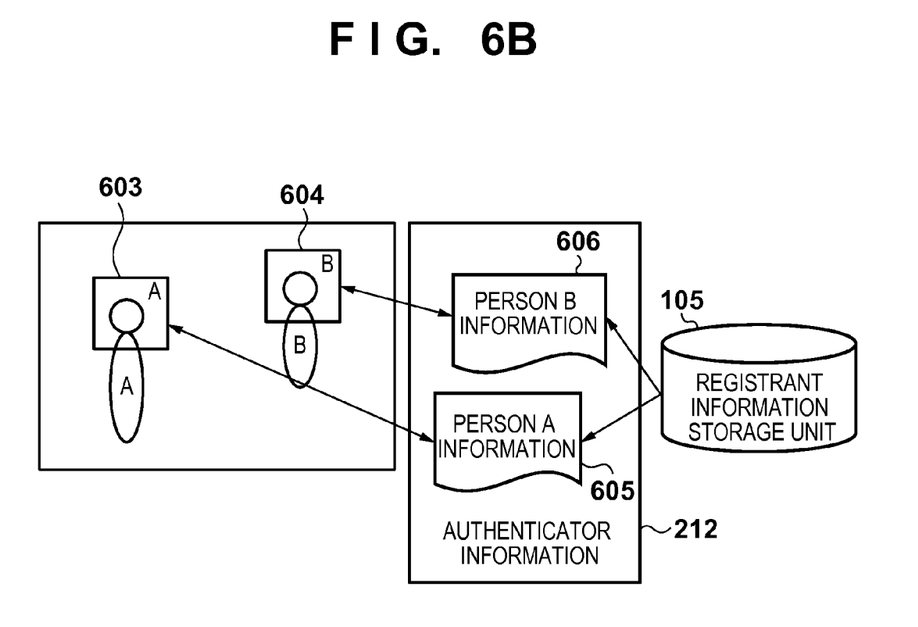
FIG. 6B is a view for explaining a case where a person is matched according to the second embodiment.

In FIG. 6A, a person A 601 and a person B 602 are detected on a display screen, and then tracking by the object tracking unit 103 of the detected objects is initiated. For the tracked objects tracking information is held. In the object matching unit 211, face detection processing is executed at a region of a detected object. In a case where a face is detected, an authentication of a person is performed by matching with registrant information recorded in the registrant information storage unit 105. In a case where a person is authenticated, an authentication frame 603, indicating the person A, is displayed for the person A as shown in FIG. 6B. Also, an authentication frame 604 indicating the person B is displayed for the person B. At this time, the object matching unit 211 retrieves as match information from the registrant information storage unit 105, and records on another memory as the authenticator information 212, person A information 605 and person B information 606. The object matching unit 211 sets the authentication frequency for the authentication frames 603 and 604 to be lower.

Figure 6C:
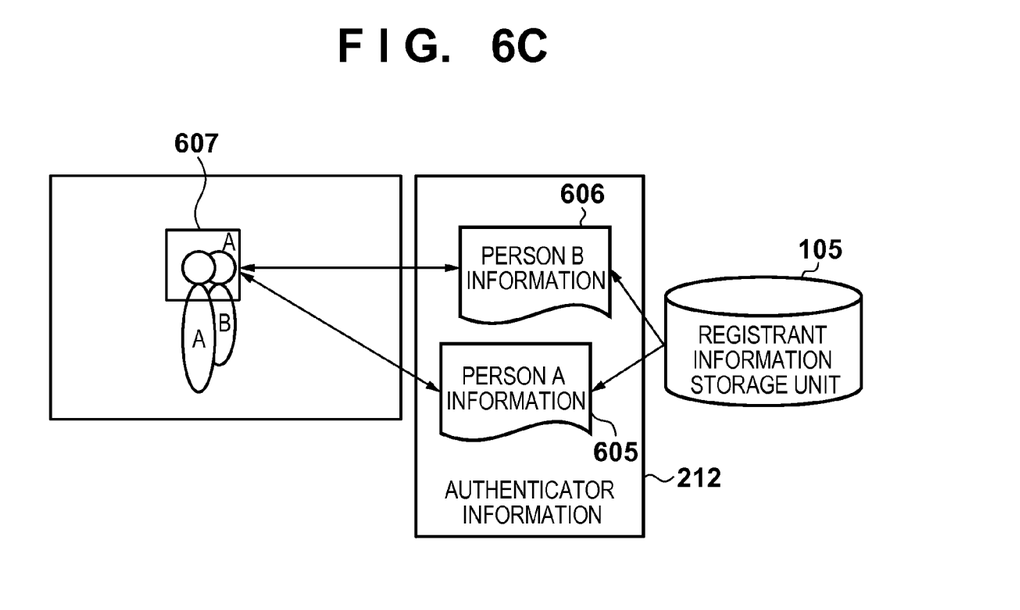
FIG. 6C is a view for explaining a case where a person is matched according to the second embodiment.

Next, as shown in FIG. 6C, an overlapping of the people occurs. At this time, the object tracking unit 103 generates tracking information for the two integrated objects. In such a case, the object matching unit 211 executes face detection processing at a region of the tracked object. Matching of the detected face with the person A information 605 or the person B information 606 recorded in the authenticator information 212 is performed, and the detected face is matched. In a case where the matching with the person A information 605 or the person B information 606 recorded in the authenticator information 212 fails, matching with registrant information in the registrant information storage unit 105 is performed. In the registrant information storage unit 105, a plurality of registrant information is registered in advance.

In FIG. 6C, an authentication frame 607, indicating the person A, is displayed because the person A is displayed in the front of the display screen. The object matching unit 211 sets the matching frequency of the person A information 605 and the image in the authentication frame 607 to be lower. The object matching unit 211 sets the matching frequency of the person B information 606 and the image in the authentication frame 607 to be higher.

Figure 6D:
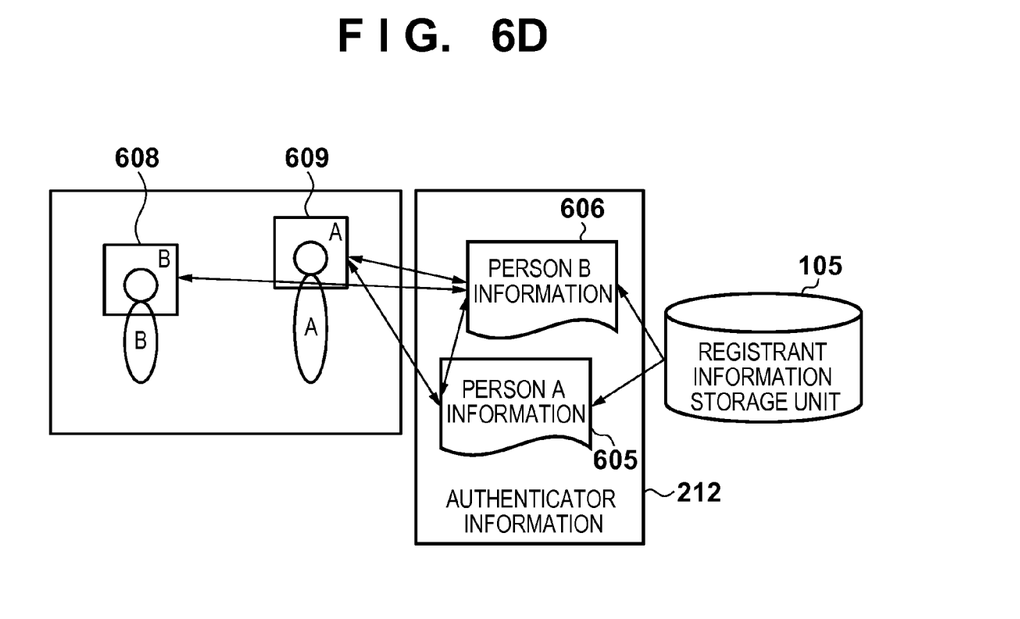
FIG. 6D is a view for explaining a case where a person is matched according to the second embodiment.

Next, as shown in FIG. 6D, the overlapping people separate and are detected as two objects. At this time, the object tracking unit 103 generates the tracking information for divided objects. In such a case, the object matching unit 211 executes face detection processing at regions of the objects. Matching of the detected face with the person A information 605 or the person B information 606 recorded in the authenticator information 212 is performed, and matching of the detected face is performed. In FIG. 6D, an authentication frame 608 indicating the person B is displayed for the person B, and an authentication frame 609 indicating the person A is displayed for the person A. The object matching unit 211 sets the matching frequency for the images in the authentication frames 608 and 609 to be lower.

As explained above, by the second embodiment, information of an object matched/authenticated in the object matching unit 211 is saved separately as authenticator information, and in a case where division or integration of the object occurs, the saved authenticator information is matched with priority. With this, in a case where the authenticating target object is matched to the saved authenticator information, it becomes unnecessary to perform the authentication processing, and it becomes possible to realize the object matching processing with less processing load and more precision.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162801, filed Aug. 5, 2013 and Japanese Patent Application No. 2014-102734, filed May 16, 2014, which are hereby incorporated by reference herein in their entirety.

What is claimed is:

1. A determination apparatus operable to determine whether a predetermined process for detecting a predetermined object is performed on a plurality of frames of a moving image, the apparatus comprising a processor configured to:
determine whether the predetermined object is detected by the predetermined process performed on a first one of the plurality of frames of the moving image; and
determine, when it is determined that the predetermined object is detected in the first one of the plurality of frames, that the predetermined process for detecting the predetermined object is performed on a second one of the plurality of frames that is later than the first one of the plurality of frames by a first frame number and that the predetermined process for detecting the predetermined object is not performed between the first and the second one of the plurality of frames, and when it is determined that the predetermined object is not detected in the first one of the plurality of frames, that the predetermined process for detecting the predetermined object is performed on a third one of the plurality of frames that is later than the first one of the plurality of frames by a second frame number smaller than the first frame number.

2. The determination apparatus according to claim 1, wherein the processor, in accordance with an object dividing into a plurality of objects, determines that the predetermined process for detecting the predetermined object in the plurality of frames is performed on more frames than before the object divides into the plurality of objects.

3. The determination apparatus according to claim 1, wherein the processor stores information indicating that the predetermined object is detected, and resets the information when an object divides into a plurality of objects.

4. The determination apparatus according to claim 1, wherein the processor, in accordance with an object being integrated, determines that the predetermined process for detecting the predetermined object in the plurality of frames is performed on more frames than before the object is integrated.

5. The determination apparatus according to claim 1, wherein the processor determines whether a person with a predetermined face is detected by the predetermined process.

6. The determination apparatus according to claim 1, wherein the processor determines whether the predetermined object is detected in the plurality of frames of the moving image captured by a camera.

7. A determination apparatus operable to determine whether a predetermined process for detecting a predetermined object is performed on a plurality of frames of a moving image, the apparatus comprising a processor configured to:
determine whether the predetermined object is detected by the predetermined process performed on a first one of the plurality of frames of the moving image;
determine, in accordance with an object dividing into a plurality of objects in a second one of the plurality of frames, that the predetermined process for detecting the predetermined object is performed on a third one of the plurality of frames that is later than the second one of the plurality of frames by a first frame number; and
determine that the predetermined process for detecting the predetermined object is performed on a fourth one of the plurality of frames that is later than the first one of the plurality of frames by a second frame number larger than the first frame number before the object divides into the plurality of objects, and that the predetermined process for detecting the predetermined object is not performed between the first and the fourth one of the plurality of frames.

8. The determination apparatus according to claim 7, wherein the processor determines whether a person with a predetermined face is detected by the predetermined process.

9. The determination apparatus according to claim 7, wherein the processor determines whether the predetermined object is detected in the plurality of frames of the moving image captured by a camera.

10. A determination apparatus operable to determine whether a predetermine process for detecting a predetermined object is performed on a plurality of frames of a moving image, the apparatus comprising a processor configured to:
determine whether the predetermined object is detected by the predetermined process performed on a first one of the plurality of frames of the moving image;
determine, in accordance with an object being integrated with another object in a second one of the plurality of frames, that the predetermined process for detecting the predetermined object is performed on a third one of the plurality of frames that is later than the second one of the plurality of frames by a first frame number; and
determine that the predetermined process for detecting the predetermined object is performed on a fourth one of the plurality of frames that is later than the first one of the plurality of frames by a second frame number larger than the first frame number before the object is integrated with the other object, and that the predetermined process for detecting the predetermined object is not performed between the first and the fourth one of the plurality of frames.

11. The determination apparatus according to claim 10, wherein the processor determines whether a person with a predetermined face is detected by the predetermined process.

12. The determination apparatus according to claim 10, wherein the processor determines whether an object in one of the plurality of frames corresponds to any one of a plurality of predetermined objects, and stores the one of the plurality of predetermined objects determined to correspond to the object in the one of the plurality of frames, and in accordance with the object being integrated with another object in another one of the plurality of frames, determines whether the stored one of the plurality of predetermined objects exists in the another one of the plurality of frames preferentially out of the plurality of predetermined objects.

13. The determination apparatus according to claim 10, wherein the processor determines whether the predetermined object is detected in the plurality of frames of the moving image captured by a camera.

14. A method of determining whether a predetermined process for detecting a predetermined object is performed on a plurality of frames of a moving image, the method comprising:
   determining whether the predetermined object is detected by the predetermined process performed on a first one of the plurality of frames of the moving image; and
   determining, when it is determined that the predetermined object is detected in the first one of the plurality of frames, that the predetermined process for detecting the predetermined object is performed on a second one of the plurality of frames that is later than the first one of the plurality of frames by a first frame number and that the predetermined process for detecting the predetermined object is not performed between the first and the second one of the plurality of frames, and when it is determined that the predetermined object is not detected in the first one of the plurality of frames, that the predetermined process for detecting the predetermined object is performed on a third one of the plurality of frames that is later than the first one of the plurality of frames by a second frame number smaller than the first frame number.

15. The method according to claim 14, wherein whether a person has a predetermined face is detected by the predetermined process.

16. A method of determining whether a predetermined process of a detecting apparatus for detecting a performed on a plurality of frames of a moving image, the method comprising:
   determining whether the predetermined object is detected by the predetermined process performed on a first one of the plurality of frames of the moving image;
   determining, in accordance with an object dividing into a plurality of objects or the object being integrated with another object, that the predetermined process for detecting the predetermined object is performed on a second one of the plurality of frames that is later than the first one of the plurality of frames by a first frame number; and
   determining that the predetermined process for detecting the predetermined object is performed on a third one of the plurality of frames that is later than the first one of the plurality of frames by a second frame number larger than the first frame number before the object divides into the plurality of objects or the object is integrated with the other object, and that the predetermined process for detecting the predetermined object is not performed between the first and the third one of the plurality of frames.

17. The method according to claim 16, wherein whether a person has a predetermined face is detected by the predetermined process.

18. A non-transitory computer-readable storage medium storing a computer program for determining whether a predetermined process of a detecting apparatus for detecting a predetermined object is performed on a plurality of frames of a moving image, the computer program comprising:
   determining whether the predetermined object is detected by the predetermined process performed on a first one of the plurality of frames of the moving image; and
   determining, when it is determined that the predetermined object is detected in the first one of the plurality of frames, that the predetermined process for detecting the predetermined object is performed on a second one of the plurality of frames that is later than the first one of the plurality of frames by a first frame number and that the predetermined process for detecting the predetermined object is not performed between the first and the second one of the plurality of frames, and when it is determined that the predetermined object is not detected in the first one of the plurality of frames, that the predetermined process for detecting the predetermined object is performed on a third one of the plurality of frames that is later than the first one of the plurality of frames by a second frame number smaller than the first frame number.

19. The non-transitory computer-readable storage medium according to claim 18, wherein whether a person has a predetermined face is detected by the predetermined process.

20. A non-transitory computer-readable storage medium storing a computer program for determining whether a predetermined process of a detecting apparatus for detecting a predetermined object is performed on a plurality of frames of a moving image, the computer program comprising:
   determining whether a predetermined object is detected by the predetermined process performed on a first one of the plurality of frames of the moving image;
   determining, in accordance with an object dividing into a plurality of objects or the object being integrated with another object, that the predetermined process for detecting the predetermined object is performed on a second one of the plurality of frames that is later than the first one of the plurality of frames by a first frame number; and
   determining that the predetermined process for detecting the predetermined object is performed on a third one of the plurality of frames that is later than the first one of the plurality of frames by a second frame number larger than the first frame number before the object divides into the plurality of objects or the object is integrated with the other object, and that the predetermined process for detecting the predetermined object is not performed between the first and the third one of the plurality of frames.

21. The non-transitory computer-readable storage medium according to claim 20, wherein whether a person has a predetermined face is detected by the predetermined process.

* * * * *